United States Patent                                                [11] 3,599,757

| [72] | Inventors | Masanobu Takamatsu;<br>Hiroshi Tominaga, both of Yokohama-shi, Japan |
|------|-----------|--------|
| [21] | Appl. No. | 831,571 |
| [22] | Filed | June 9, 1969 |
| [45] | Patented | Aug. 17, 1971 |
| [73] | Assignee | Tokyu Sharyo Seizo Kabushiki Kaisha<br>Yokohama-shi, Kanagawa-ken, Japan |
| [32] | Priority | June 25, 1968, Nov. 14, 1968, Nov. 15, 1968 |
| [33] | | Japan |
| [31] | | 43/44,115, 43/83,416 and 43/83,602 |

[54] ENERGY ABSORBER BY MEANS OF PLASTIC DEFORMATION
3 Claims, 19 Drawing Figs.

[52] U.S. Cl. .................................................. 188/1 C,
74/492, 293/70
[51] Int. Cl. .................................................. F16f 7/12,
B62d 1/18
[50] Field of Search ........................................ 74/492;
188/1 C; 293/70

[56] References Cited
UNITED STATES PATENTS

| 3,146,014 | 8/1964 | Kroell | 188/1 (C) X |
| 3,298,465 | 1/1967 | Stastny | 188/1 (C) |
| 3,504,567 | 4/1970 | Ohashi et al. | 188/1 (C) X |
| 3,511,345 | 5/1970 | Takamatsu et al. | 188/1 (C) |

FOREIGN PATENTS

| 1,342,654 | 9/1963 | France | 188/1 (C) |

Primary Examiner—Duane A. Reger
Attorney—Blum, Moscovitz, Friedman & Kaplan

ABSTRACT: This invention relates to a device for absorbing energy by means of plastic deformation which, when compressed by an external force or forces, exhibits a certain deformative resistance and, without being fractured, reduces the shock due to the external impact force through continuous and permanent plastic deformation, and more particularly to a machine element buffer as an energy absorber in which a predetermined amount of energy may be absorbed under a certain load with at least possible reduction of length and with no danger of springback after the deformation.

PATENTED AUG 17 1971
3,599,757
SHEET 1 OF 3
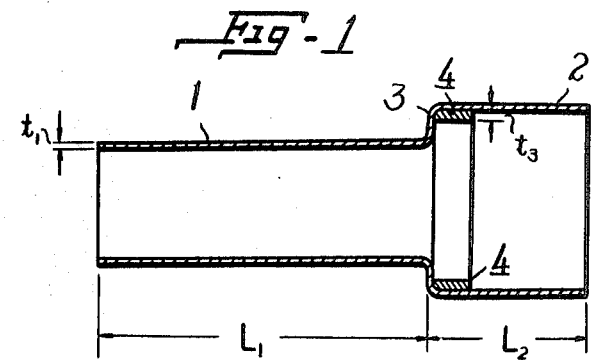
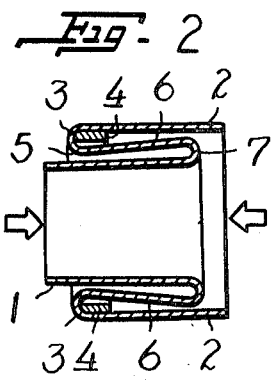
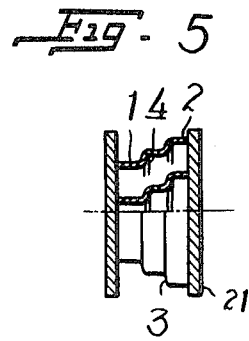
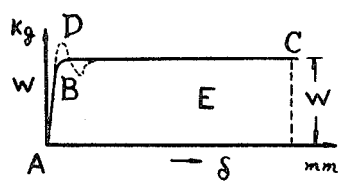
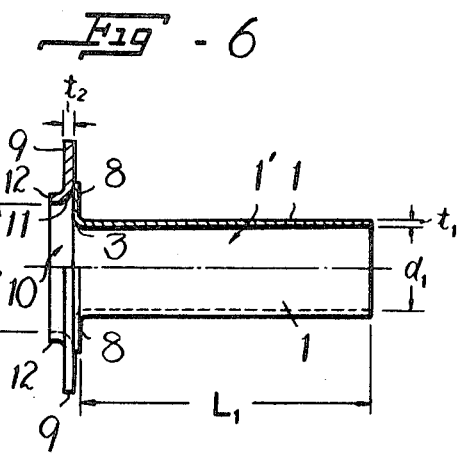
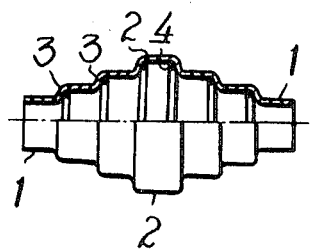

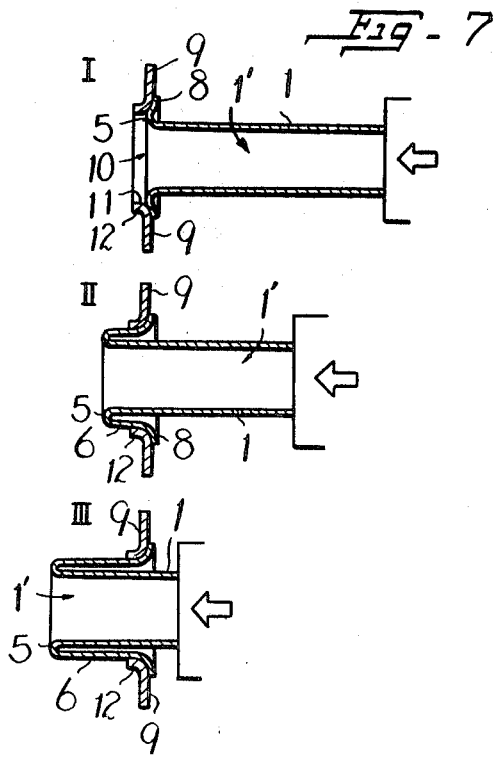
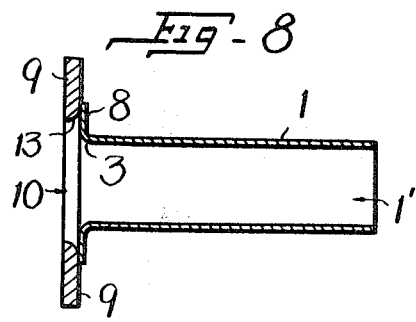
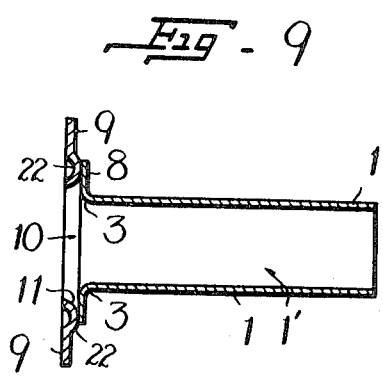
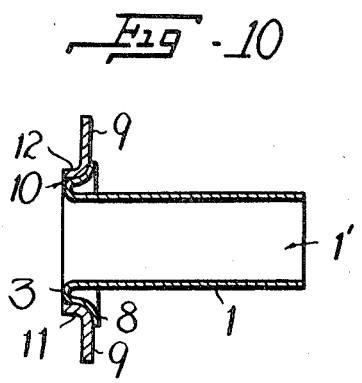
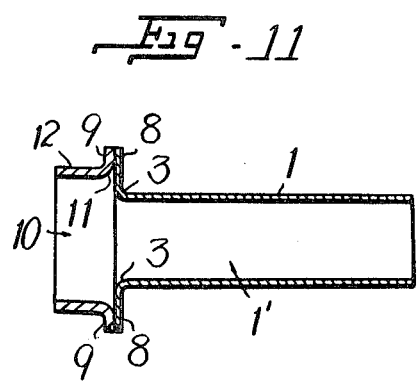
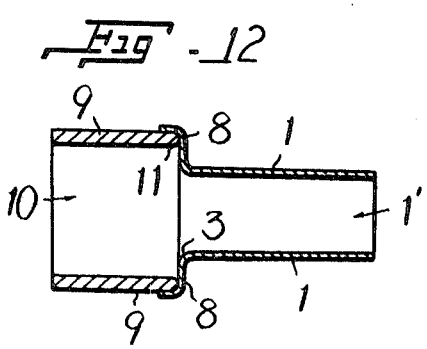

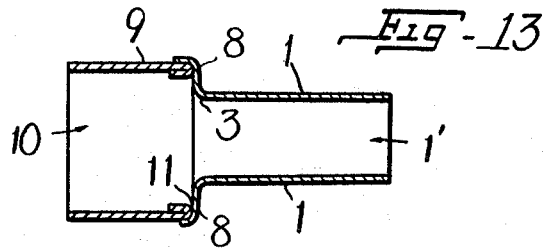
Fig. 13
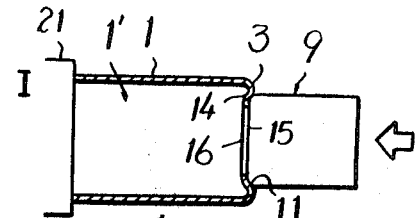
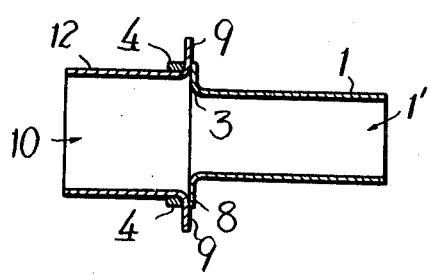
Fig. 14
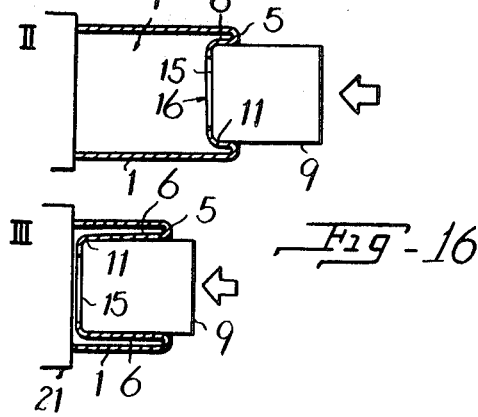
Fig. 16
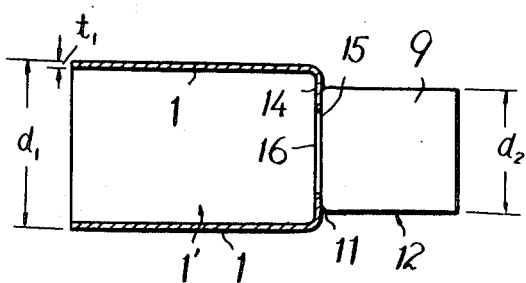
Fig. 15
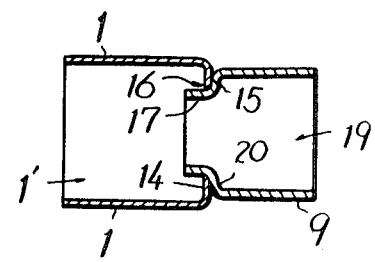
Fig. 17
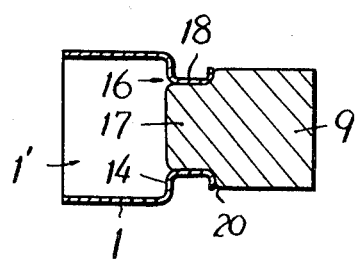
Fig. 18
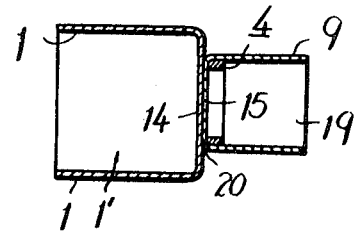
Fig. 19

3,599,757

ENERGY ABSORBER BY MEANS OF PLASTIC DEFORMATION

BRIEF SUMMARY OF THE INVENTION

This invention relates to an energy absorber through plastic deformation for use with transport facilities such as automobiles and emergency refuge means, which provides a buffer action through absorption of impact force and which undergoes no springback after the shock absorption.

In the traffic accidents, especially of the automobile, the projecting elements such as the steering wheel, levers hit the driver at the time of collision and their excess impact force is so strong that it is the hazard to the life of the driver. Moreover in various machines, equipments, etc. excess load or impact causes troubles, malfunctioning or damages to the important parts thereof. Recently safety of automobile, machine, etc. has been emphasized, demanding much consideration to the automatic safety so that the driver may be safe at the time of collision because, for example, the steering wheel is compressed under certain load to absorb the impact energy, or that the machines may be free of serious damages.

Generally, springs which are utilized as energy absorbers make use of the inherent elasticity of the material and require a special structure to keep the load at a constant level independently of the character of the load and its relationship with the elastic deformation, and they are greatly shocked by impact force. Also, in a buffer such as spring which takes advantage of the material elasticity, the energy is built up as that of compressive strain and therefore the buffer springs back to the original position as the motion is stopped or where the load is removed. This springback may cause a damage or injury in a clash accident of transport facilities, emergency escape, etc. or may add to the disastrous effect of any such accident.

The spring which is utilized as an energy absorber makes use of elasticity of its material, even when the mechanical spring device is provided in the automobile, the projecting parts or elements such as the steering wheel hit the driver and their excess impact force at the time of collision is the hazard to the life of the driver. In case of the machines, the design is very much complicated in order to ensure the safety, and the essential parts in the machine are difficult to be free from the damages in a positive manner. Therefore the conventional energy absorber has many economical and functional disadvantages.

In order to absorb the impact energy, there have been known the methods of utilizing the spring and fluid such as oil or air. In case of the spring absorber, the load acting on the spring varies according to the amount of compression of the spring. When the length of contraction is kept constant and the maximum load is limited, the spring absorber has the disadvantage that its absorbing energy becomes less. It is difficult to maintain the constant load without utilizing combinations of such as special springs and links. Thus the structure of the spring-type absorber is very much complicated. In case of the hydraulic-type energy absorber wherein the impact energy is absorbed and damped by means of oil or air which is filled within the cylinder and compressed and made to lead through an orifice, there are disadvantages that the structure is rather complicated and that resistance depends on compression speed so that it is difficult to obtain a constant force at any impact speed.

Awaited for a long time is an energy absorber simple in structure, wherein the variation of load during the process of compression while the impact energy is absorbed may be prevented with a certain range, a large compressive plastic deformation takes place under a substantially constant load and the impact energy given to the absorber from outward may be absorbed while the absorber is being deformed, whereby the excess impact force is not developed in the body adjacent to the energy absorber.

The present invention provides the mechanical element in the safety device as the effective and economical energy absorber which eliminates the disadvantages of the conventional energy absorber and meets the above-described requirements.

The present invention is directed to the provision of an economical energy absorber which can effectively absorb the energy of impact force and lessen the injury and damage due to such impact.

Another object of the invention is to provide an energy absorber by means of plastic deformation which provides a given form of buffer to absorb the energy of a moving object and reduce the speed or stop the motion and which is simple in construction and inexpensive to manufacture, wherein the load can be maintained at a constant value and a predetermined amount of energy can be absorbed in a most desirable manner.

A yet further object of the present invention is to provide a method of producing an energy absorber in which the plastic property of the material to be used is fully utilized, each portion of the material is subjected to the continuous and successive deformation and there is no springback as is the case of the mechanical spring even after releasing the load.

A still further object of the present invention is to provide an energy absorber which is utilized in the connectable portion connecting means and in which the impact force will not exceed a predetermined value, the impact energy is absorbed in the form of the deformation energy of the absorber member and the excess force is prevented from acting on the connected body, whereby useful effects are produced as safety means.

A further object of the present invention is to provide a machine element compact in size, light in weight and inexpensive to manufacture in which a uniform resistance force is developed when compressed, the element will not return to its original shape or springback even after releasing the load, this resistance force, and load characteristics may be freely selected, the length of compression, may be freely selected in a wide range and in the production of this mechanical element its absorbing energy corresponding to the compressive force and compressive length may be easily adjusted.

The present invention is to ensure the safety driving of a vehicle or safety operation of the machines, etc., and used in the safety structure in the automobile, aircraft, railway or emergency escape equipment for limiting the impact force within a predetermined range and absorbing the energy. The invention has for its object to mass-produce the machine element which serves many various purposes in an effective manner for preventing the excess impact force to act on the interior of the machine due to an unexpected accident from causing the damages to the important parts of the machine.

In order to realize the foregoing objects the present invention provides, in essence, an energy absorber by means of plastic deformation characterized in that a tubular body made of mild steel or the like which is ductile and exhibits suitable resisting force against plastic deformation is integrally formed through a round stepped portion with a nonplastic tubular portion having a diameter larger or smaller than the effective diameter of said tubular body, and is provided with an annular reinforcing ring of a relatively small width along the inner periphery of said stepped portion, sand when a compressive force acts on said tubular body, in the axial direction thereof, the tubular body is subjected to successive plastic deformation and folded back to form a tubular portion of an intermediate diameter.

An important feature of the present invention is that the energy absorber by means of plastic deformation is characterized in that a tubular body made of mild steel, aluminum or the like which is ductile and exhibits suitable resisting force against plastic deformation is integrally formed through a curved portion with a plane, protruding support portion, and a guide member formed with a hole to guide and receive the portion to be plastically deformed in succession by an axial compressive force that is exerted on the tubular body is connected to and arranged with said support portion in such a manner that the tubular body and the hole are jointed in a concentric relationship, and, further, the rigidity of said guide member is increased by the wall thickness, material, or the shape of the tubular body, or by any combination of these factors.

An important feature of the present invention is that the energy absorber by means of plastic deformation characterized in that a tubular body made of a material such as mild steel or aluminum having ductility and suitable resisting force against plastic deformation is formed integrally with a plane bottom portion through a curved portion and that a guide member having a greater rigidity than the tubular body is jointed to the bottom portion concentrically with the hollow of the tubular body in such a manner that the portion to be successively deformed plastically by the compressive force that is exerted axially on said tubular body may be guided and introduced into the hollow of said tubular body.

An energy absorber according to the invention has remarkably improved characteristics against external forces, and is capable of buffering impacts and of producing a great buffer action with a relatively small compression load despite the very small size and simplified construction. Since the portion subjected to plastic deformation is free from any working strain, the energy absorber is homogenous throughout and attains a constant deformation resistance, and has such a configuration that it can be readily manufactured from a simple work material as is the case with ordinary piping material.

If the energy absorber of the present invention is attached to the connection or joint of steering wheel or bumper of automobile, the energy of collision can be effectively absorbed to reduce the harmful shock and the possibility of injury and damage. In devices such as springs which serve as buffers taking advantage of the elasticity of the materials themselves, the energy of collision is built up as energy of compressive strain and therefore the springback due to the stop of motion causes the release of accumulated energy, thus worsening the hazard. By contrast, the energy absorber of the invention exerts its buffer action while consuming the energy in the work for plastic deformation of the material as above described, and hence it has no springback and gives a desirable effect with extreme safety.

As for the component members of the energy absorber to be used in accordance with the invention, free choice of load upon compression is ensured by the possibility of adjusting the diameter, wall thickness $t_1$, and material of the small-diameter portion to be plastically deformed, the difference in diameter of the large- and small-diameter portions, etc. Also, the amount of compression can be controlled as by length $L_1$. These features make it possible to preset the amount of absorption work to a desired value.

According to the present invention, the tubular body is folded back along the curved portion provided for the purpose of forming the tubular portion of intermediate diameter and thereby reinforcing the large-diameter portion against deformation. Moreover, the small-diameter portion is provided with a fold-back deformation for buffering purpose. The reinforcement is simple and effective (the dimensions being freely chosen because the wall thickness has only to be $t_3 \approx t_1$ and it is fabricated by simply folding such a plate), and, since it is attached inwardly of the device as by spot welding, the outward appearance is not marred thereby. These features are combined together to provide convenience and economic advantage.

In point of the configuration, the energy absorber of the invention can be fabricated by expanding an ordinary piping material as by hydroforming. Another contributory factor for the facility of fabrication is that the length $L_2$ of the portion to be expanded or bulged has only to be, for example, one-third of the overall length $L_1+L_2$. On the other hand, the portion to be plastically deformed (small-diameter portion) is not bulged and is uniform in quality, and therefore it provides a constant resisting force against deformation (compressive load) regardless of the working conditions employed at the time of forming.

When the energy absorber of the invention is adopted, the device after a buffering action exhibits a simple contour, the deformed portion being contained in the rigid large-diameter portion or guide member, and thus it provides safety at the time of collision, for example of an automobile because there is formed no dangerous projection. In addition, it is easy to fabricate and the low cost warrants throwaway of the device as a replaceable safety part. The large compressible amount provides a constant resisting force against compression which in turn ensures effective and positive absorption of kinetic energy as by collision. This also represents a significant improvement over the conventional shock absorbers.

The energy absorber of the invention may be used as one of mechanical elements in buffer device because it can be used with advantage in spacing cylinders and the like for the portions of structures where a certain load is required, regardless of the size of the buffers. With an extremely simplified construction, it can retain a fairly large compression potential for its length and exhibit a constant resistance to deformation on compression, and it can positively absorb the kinetic energy due to clash or the like with no springback, thus effectively avoiding spread or intensification of the disaster to a great practical advantage.

Although the present invention is described in further detail hereunder in connection with specific embodiments thereof, it should be understood that the invention is not restricted thereto but it is possible to add and incorporate any effective means for the improvements of plastic deformation, absorption of impact energy, deformative resistance and inductivity, and also for the reinforcement and economy of the component members.

In the accompanying drawings showing embodiments of the present invention:

FIG. 1 is a sectional side view of an energy absorber according to the invention;

FIG. 2 is a sectional side view of the absorber shown in FIG. 1 in the state plastically deformed by compression;

FIG. 3 is a characteristic curve representing the relation between the compressive load and amount of compression at the time of compression of the energy absorber according to the invention;

FIG. 4 is a partly sectional side view of another embodiment of the invention;

FIG. 5 is a partly sectional side view of another embodiment;

FIGS. 6 to 19 show other embodiments, with structures consisting of the essential part of the embodiment of FIG. 1 divided and connected together in modified ways, wherein;

FIG. 6 is a partly sectional side view of one of such embodiments;

FIG. 7 shows sectional side views illustrating the sequence of plastic deformation due to compression of the embodiment of FIG. 6;

FIGS. 8 to 15 are sectional side views of still other embodiments with partial modifications to the embodiment shown in FIG. 6;

FIG. 16 is a sectional side view of a further embodiment of the invention;

FIG. 17 shows sectional side views illustrating the sequence of plastic deformation due to compression of the embodiment of FIG. 16; and FIGS. 17 to 19 are sectional side views of yet other embodiments of the invention with partial modifications to the embodiment shown in FIG. 16.

Referring specifically to FIGS. 1 and 2, the embodiment consists of a tubular small-diameter portion 1 formed of a material such as mild steel which has adequate ductility and plastic deformation resistance to a relatively thin wall thickness $t_1$, and a large-diameter portion 2 on the extension from the small-diameter portion 1, formed continuously with a stepped portion 3 provided in between. Usually the small-diameter portion 1 and large-diameter portion 2 which sandwich the stepped portion 3 therebetween are formed altogether in one piece with a suitably rounded corner as shown. The configurations of such a tubular body are such that they permit tube materials to be easily expanded and formed as by hydraulic forming. In the stepped portion 3 there are fitted along the inner wall of the large-diameter portion 2 a reinforcing ring 4 which is formed of a strip of mild steel or the like coiled to an annular shape either with a short gap between the cut ends or with no such gap to an endless fashion. In position where it is abutted to the stepped portion 3, the reinforcing ring 4 is secured to the inner wall surface of the large-diameter portion 2 as by spot welding. Of the outer periphery of the reinforcing ring 4, the portion facing the corner of the stepped portion 3 is beveled to ensure a close contact with the latter as shown in FIG. 1. The wall thickness $t_3$ of the reinforcing ring 4 is substantially equal to or somewhat greater than the wall thickness $t_1$ of the small-diameter portion 1, and the width of the reinforcing ring 4 may be relatively short. The small-diameter portion 1 usually has a length $L_1$ about twice the length $L_2$ of the large-diameter portion 2.

When the energy-absorbing buffer according to the invention is compressed with a pressure P exerted from both ends, the whole body tends to yield and the small-diameter portion 1 is plastically forced into the large-diameter portion 2. At this time the latter remains undeformed because it is reinforced with the reinforcing ring 4 at the portion contiguous to the stepped portion 3. The portion of the small-diameter portion 1 adjacent the stepped portion 3 is guided by the end face of the reinforcing ring 4 and led thereinto, thus naturally forming a first fold 5, an intermediate-diameter portion 6, and a second fold 7, as shown in FIG. 2. As the compression is kept on, the first fold 5 remains as it is but the second fold 7, by contrast, is displaced with the the advance of the small-diameter portion 1 into the large-diameter portion 2, until the small-diameter portion 1 is turned back along the second fold 7 with inside out, thus forming the intermediate-diameter portion 6. In inverse proportion to the decrease in the length of the small-diameter portion 1, the intermediate-diameter portion 6 gains length until the small-diameter portion 1 passes through the second fold 7. With further plastic deformation a resisting force is produced. This deformation is continuously carried out and, because the resisting force remains constant during this period, the load required for the compression is substantially constant. Throughout this the large-diameter portion 2 retains the original shape.

Assuming that the small-diameter portion 1 has entered completely into the large-diameter portion 2, the length of the intermediate-diameter portion 6 is one-half of the original length $L_1$ of the small-diameter portion 1, and if it is just accommodated in the large-diameter portion 2, it follows that the length $L_2$ of the large-diameter portion 2 has only to be about one-half of the $L_1$. In other words, the overall length before compression ($L_1+L_2$) is reduced by the total compression to $L_2$, or about one-third of the original length.

When this energy absorber is compressed, as indicated by the characteristic curve in FIG. 3, the absorber in the original state A is slightly deformed elastically along the line A—B, and the material begins yielding at the point B. The first fold 5, intermediate-diameter portion 6, and the second fold 7 begin to form, in succession, in the vicinity of the stepped portion 3. Then, along the line B—C, the inversive deformation above-described proceeds continuously while the load is kept constant. The area E defined by the axis of abscissa and the line A—B—C is substantially rectangular, and this area represents the amount of work to which the energy absorber is subjected during the deformation by compression, or the amount of energy absorbed by the absorber.

In reducing the speed of a motion or stopping it through absorption of the energy of a moving body by some buffer means, or in buffering a motion, the buffer exhibits a resisting force during the speed reduction for buffering. This resisting force corresponds to the compressive load shown in FIG. 3 (or the level of the line B—C). Thus, the graph indicates that, when a certain kinetic energy E is absorbed with a certain amount of compression, the resisting force required is at a minimum with the rectangular characteristic pattern. It will be appreciated from this that the buffer load, or the impact of collision, can be reduced to a minimum by the use as a buffer of an energy absorber according to the present invention.

Further, the relation between $L_1$ and $L_2$ already described is one of most rational examples, and in actual arrangement it is not objectionable to provide additional length for fitting purpose.

It is also apparent that the energy absorber may be provided with a multiplicity of such stepped portions 3 as illustrated in FIGS. 4 and 5, and that various other combinations are also possible.

In FIGS. 6 through 15 there are shown other embodiments wherein the stepped portions 3 are not formed integrally with the rest but are provided separately. Referring specifically to FIGS. 6 and 7, a relatively thin cylindrical body 1 such as a tubing having a wall thickness $t_1$ and made, for example, of mild steel, aluminum or the like which possesses suitable plasticity and strength is formed in one piece with a flange or flat supporting portion 8 which is extended outwardly by way of a rounded corner 3 at one end thereof and at a right angle to the center axis of the tube, thus forming an energy absorber. A guide member 9 of a rigid material such as a disclike material having a thickness $t_2$ greater than the thickness $t_1$ of the tube is formed with a through hole 10 in the center. In such a manner that this hole 10 and the hollow 1' of the tubular body 1 may be aligned concentrically the guide member 9 is securely jointed to the supporting portion 8 as by welding or riveting.

The guide member 9 in the embodiment being described corresponds to the large-diameter portion 2 equipped with a reinforcing ring 3 in any of the preceding embodiments. It is formed of an annular plate, and a cylindrical portion 12 with an inside diameter $d_2$ is provided by way of a rounded corner 11 along the edge of the center hole 10, so as to serve as a guide wall. The tubular body 1 has an inside diameter $d_1$ and may have any suitable length which is freely chosen, though in practically embodiments the relation is predetermined so that $(d_2-d_1)$ may be greater than $4t_1$. This relation $(d_2-d_1) > 4t_1$ is chosen, for one thing, because the tubular body 1 when plastically deformed is folded back to form an intermediate cylindrical portion 6 as better shown in FIG. 7. This is also related to the wall thickness $t_1$. For the other, the above relation is effective in giving a suitable roundness 5 to the folded portion. These factors combine to dictate the strength of the resulting absorber. The provision of the rounded corner 11, and preferably the cylindrical portion 12, on the guide member 9 is beneficial in positively guiding the tubular body 1 in the early stage of inversive deformation. Because the corner 3 of the tubular body 1 and the corner 11 of the guide member 9 are both rounded, the tubular body is kept from buckling under load, and there is no possibility of producing a peak as indicated by the dotted line D in FIG. 3. Further, this construction is contributory to the prevention of dangers such as destruction due to shock upon sudden compression.

By suitably choosing the inside diameter $d_1$, wall thickness $t_1$, and type of material for the tubular body 1 to be plastically deformed, the wall thickness $t_2$ and material for the guide member 9, the inside diameter $d_2$ of the center hole 10, the relationship $(d_2-d_1)$, etc., it is possible to predetermine the load on compression as desired. Also, the amount of compression can be regulated through the length $L_1$ of the tubular body, and the amount of absorption work can be easily maintained within a desired range. For example, the relation $t_2>t_1$ is established in the embodiment shown. This relation takes effect when the two members are made of the same material, and is not always critical for other combinations. Depending on the difference in rigidity of the materials used, the relation may be modified to $t_2 \lessapprox t_1$. Considering the correlation with the shape, it is reasonable to use a guide member 9 at least superior in rigidity to the tubular body 1.

In the embodiment shown in FIG. 8, a guide member 9 of a relatively great wall thickness is used and the center hole is rounded along the edge 13 taking advantage of the thickness. Also, as shown in FIG. 9, the edge 13 may be formed with a rib 22 for added resistance (or, as an alternative, a ring member may be attached for the same purpose). This is useful in forming the cylindrical portion 12.

The curved portion 3 of the tubular body 1 may be formed protrudingly at the fold in such a way that it can be combined with and fitted in the center hole 10 of the guide member 9, with advantage, as illustrated in FIG. 10. Further, the guide member 9 of a plate material may be replaced by an extension of the cylindrical portion 12, that is, a flanged cylindrical body like the tubular body may be jointed to the latter by abutting the flange to the supporting portion 8. (FIG. 11)

The other end of the tubular body 1 and the structure of the guide member 9 may take many different shapes depending on the applications of the energy absorbers thus fabricated. Similarly, the tubular body may be shaped to any suitable cross section, circular or square or otherwise.

The configurations of the tubular body 1 and the guide member 9 are such that they can be usually formed by expanding tubing and plate materials as by hydraulic molding or forming.

In the embodiment shown in FIG. 12, the guide member 9 is formed of a thick walled tube with the end adjacent the tubular body 1 is rounded, while the flanged supporting portion 8 of the tubular body 1 is so bent and curved as to receive the tube. In FIG. 13, the abutting end of the guide member 9 is folded back inwardly or outwardly and, where necessary, a reinforcing ring 4 is provided. In this embodiment the inversive deformation of the tubular body 1 can be effectively carried out.

FIG. 14 shows a modification of the embodiment of FIG. 11 in which a reinforcing ring 4 is provided. The ring may be fitted not merely to the outer surface of the tube but just as effectively to the inner surface or to the flanged part.

These embodiments have a common feature that, when the free end of the tube body 1 or the guide member 9 is pressed by an external force, the part of the supporting portion 8 which is close to the curved portion 3 is deformed while being guided by the edge of the center hole 10 of the guide member 9. (See FIG. 7—I.) As the compression goes on, the tubular body 1 is gradually deformed and turned inside out along the part close to the curved portion 3, thus forming a circular turning area 5 and an intermediate cylindrical portion 6 (FIG. 7—II). At this time, the reaction force which results from the resisting force of the tubular material against the deformation remains constant while the tubular body 1 is being gradually deformed. When the end of the tubular body 1 has advanced to a point near the guide member 9, the length of the intermediate cylindrical portion 6 is about one-half of the length of the tubular body 1 before the plastic deformation (FIG. 7—III). In such an energy absorber the relation between the compressive load and the amount of compression is advantageous both theoretically and experimentally, as indicated by the characteristic curve in FIG. 3. As can be seen, the energy absorber compressed from the original state A is slightly deformed elastically along the line A—B with a growing load. At point B the material begins yielding, and from then on the absorber is deformed with the inside progressively turned out. Since this is uniformly accomplished throughout the length of the tubular body 1, the load is kept constant. In this case the product of the reaction force and the deformation of the outer end of the tubular body 1 is approximately equal to the area E in the graph. Accordingly, the amount of energy absorbed by the absorber by the displacement of δ mm. under a uniform load of W kg. for the plastic deformation represents the rectangular characteristic E.

In reducing the speed or stopping the motion of a moving body by absorbing its energy with a buffer as above-described, or in buffering a motion, the buffer exhibits a resisting force during the course of speed reduction or buffering. While this resisting force corresponds to the level B—C of compressive load in FIG. 3, it is far less (in the case of the rectangular characteristics) than the resisting forces of conventional metallic, rubber and air springs (which invariably have generally triangular characteristics), and involves the least buffer load, or the least shock of collision.

In buffers such as springs which make use of their own elasticity, the energy is built up as that of compressive strain and is released by dint of the repulsive force as soon as the motion is stopped, thus adding to the severity of the disaster. In contrast to these, the energy absorbers as embodied and described herein are desirable because they serve to buffer the impacts while consuming the energy in the work of plastic deformation and therefore involve no repulsive force and provide maximum safety. When used on the connections of automobile bumpers, for example, they can effectively absorb the energy due to collision and remarkably reduce the shock of clash, thereby minimizing the possibility of casualty and damages.

Illustrated in FIGS. 15 to 19 are other embodiments of the invention wherein the tubular body 1 is inversely deformed inwardly instead of being inversely deformed outwardly as in the embodiments of FIGS. 7 to 14. The embodiment shown in FIGS. 15 and 16 is energy absorber consisting of a relatively thin-walled tubular body 1 of mild steel, aluminum or other material having a suitable plasticity and strength, for example a tube material having a wall thickness $t_1$, formed in one piece with a plane bottom portion 14 which is bent inwardly via a rounded curved portion 3 at one end of the tube body and at a right angle to the center axis of the tube. A guide member 9 of a material or contour which displays greater rigidity than the tubing and which has a smaller diameter than the diameter $d_1$ of the tubular body 1 is fixed as by welding or riveting to the bottom portion 14 in such a manner that it can be disposed concentrically with the hollow 1' of the tubular body 1.

In the embodiment shown, the guide member 9 is formed of a rod and is provided at its end 15 with a cylindrical portion 12 having an outside diameter $d_2$ and which serves as a guide wall via a relatively large, rounded curved portion 11 along the periphery of said end portion 15. The tubular body has an outside diameter $d_1$ and, while a suitable length may be chosen, the embodiment has a relation $(d_1-d_2)$ between the tubular body 1 and guide member 9 preselected in the same way as in preceding embodiments.

Although this embodiment uses a guide member 9 of a solid rod material, it may use a disclike or hollow article instead, where necessary. (FIG. 17) When a cylindrical member is utilized as the guide member 9, it is advisable to choose the wall thickness, type of material or configurations suitably so that correlatively the rigidity of the guide member 9 may surpass that of the tubular body 1.

While a hole 16 formed in the bottom portion 14 is not essential, it is convenient for the bending or folding, and the connection between the tubular body 1 and the guide rod member 9 can be advantageously strengthened by forming on the end portions 15 of the guide rod member 9 a projection (not shown) which fits in the hole 16. If necessary, it is possible to bend the edge of the hole 16 inwardly to form a ring-shaped cylindrical portion. It is further possible to form beforehand a recess or a protrusion on the bottom portion 14 which is adapted to engage with the guide member 9.

For example, as shown in FIG. 17, the guide member 9 consists of a tube having a projection or neck 17 fitted in and pressure welded with the hole 16 in the bottom portion 14 of the tubular body 1, in a unitary construction.

FIG. 18 shows another embodiment, wherein the bottom portion 14 of the tubular body 1 is formed with a cylindrical neck portion 18 for engagement and is also provided with a hole 16, and the projection or neck 17 of the guide member 9 is securely fitted in the cylindrical portion.

Further, in FIG. 19, there is shown one embodiment wherein the tubular body 1 is not formed with the hole 16 of the preceding embodiments in the bottom portion. The guide member 9 is formed of a cylindrical article and, where necessary, a reinforcing ring 4 is provided in the guide member 9 with the view to facilitating the folding back inwardly of the tubular body 1.

The construction of the other end of the tubular body 1 and the guide member 9 is such that many different configurations may be adopted depending on the intended uses of the resulting energy absorbers. The tubular body 1 may be shaped to have circular, square or any other suitable cross section.

When an energy absorber as embodied hereinabove is urged in the compressive direction by an external force, the part of the bottom portion 14 of the tubular body 1 which is close to the curved portion 3 is deformed while being guided by the outer periphery of the guide member 9 in FIG. 16, and the amount of energy absorbed represents the rectangular characteristics E. Thus, the construction is beneficial for minimizing the shock of clash.

Throughout the figures numeral 19 indicates a hollow defined in each guide member 9; 20 indicates a curved portion of the guide member 9 which is formed in continuation of the end portion 15, and 21 indicates a fixed part.

Although not shown, additional means may be provided for maintaining increased rigidity of the large-diameter portion 2 or guide member 9 which serves as the nondeformed portion of the tubular body 1 while the plastic deformation of the tubular body 1 proceeds with the compressive force exerted axially of the energy absorber until the compression is completed. For example, where the large-diameter portion 2 or guide member 9 is shaped like a tube, the wall of the cylindrical portion may be preformed with a striplike or tapered projection either integrally or additionally. Also, the tubular body 1 which represents the portion to be deformed and turned inside out may be formed with means for reducing the compressive force, such as for example elongate, parallel or tapered windows along the center axis thereof so as to reduce the compressive force applicable. Adjustment of the rigidity area with the provision of windows permits in turn the control of the compressive force to a desired value. Especially where a load is added to the impact, it is usually the case that the material is deformed at a high speed in the early period of the impingement, and this is considered responsible for a subsequent increase in the resisting force against the deformation and also an increase in the compressive force. In such case the provision of compressive force-reducing means is much helpful in maintaining the compressive force at a substantially constant level. Conveniently, with these windows, the load characteristics may be freely chosen by the use of suitable window contours. The end may be attained not only by windows but as well by decreasing the wall thickness of certain portion. In any case, these additional means may be provided in a variety of modes and arrangements as desired and freely chosen for energy absorbers for particular applications. The component parts, and the tubular body in particular, may take any suitable configurations, for example a circular cross section, with or without partial flattening, or may be square, oval, arcuate, polygonal, or may combine these geometrical features. Furthermore, the both ends of the energy absorber may be machined according to the intended use. It may be contemplated, for example, to attach a flange or similar flat part or form it in one piece with the main body for the convenience of jointing or connection.

I claim:

1. In an energy absorber comprising a tubular body having a first tubular portion of a first diameter; a second tubular portion axially aligned with said first tubular portion and of a second diameter different from said first diameter and a round stepped intermediate portion interconnecting the adjacent inner ends of said first and second portions, said tubular body being adapted to permit, upon the application of an axial compression force thereon, the plastic deformation of at least one of said tubular portions commencing in the region of the intersection of said tubular portion and said intermediate portion to define, after deformation, a segment of said tubular portion having a diameter intermediate between said first and second tubular portions and in overlapping relation with at least some of the other of said tubular portions and the undeformed segment of said deformed tubular portion, the improvement which comprises reinforcing ring means dimensioned for peripheral engagement with the other of said tubular portions not subject to said deformation and position adjacent the intersection of said other of said tubular portions and said round stepped intermediate portion.

2. An energy absorber as recited in claim 1, wherein said tubular body includes a third tubular portion axially aligned with said first and second tubular portions and of a third diameter different from said second diameter; a further intermediate portion interconnecting the adjacent end of said second and third tubular portions, said tubular body being adapted to permit, upon the application of an axially directed compression force thereon, the plastic deformation of at least one of said second and third tubular portions commencing in the region of the intersection of said one tubular portion and said further intermediate portion to define a deformed segment of said one of said second and third tubular portions having a diameter intermediate said second and third diameters and disposed in overlapping relation with at least some of said second and third tubular portions; and a further reinforcing ring means dimensioned for peripheral engagement with the other of said second and third tubular portions and positioned at the intersection of said other of said second and third tubular portions and said further intermediate region.

3. An energy absorber comprising a tubular body having a first tubular portion of a first diameter and a substantially outwardly radially extending portion at one end thereof joined to said tubular portion by a round corner; and a guide member having an aperture therethrough of a second diameter greater than said first diameter, said tubular body, being secured to a surface of said guide member at the radially extending portion of said tubular body, said guide member being formed with a rounded corner defining the transition between said guide member surface and the aperture therethrough, said guide member being dimensioned and formed of a material such that it has a rigidity greater than the rigidity of said tubular body, said tubular portion of said tubular body being adapted to permit, upon the application of an axial compression force thereon, the plastic deformation thereof commencing in the region of the round corner thereof to define, after free deformation, a segment of said tubular portion having a diameter intermediate between said first and second diameters and in overlapping relation with at least some of the undeformed segment of said tubular portion and said guide member aperture.